US006222175B1

United States Patent
Krymski (10) Patent No.: US 6,222,175 B1
(45) Date of Patent: Apr. 24, 2001

(54) CHARGE-DOMAIN ANALOG READOUT FOR AN IMAGE SENSOR

(75) Inventor: Alexander J. Krymski, Montrose, CA (US)

(73) Assignee: Photobit Corporation, Pasadena, CA (US)

( * ) Notice: Subject to any disclaimer, the term of this patent is extended or adjusted under 35 U.S.C. 154(b) by 0 days.

(21) Appl. No.: 09/265,133

(22) Filed: Mar. 8, 1999

Related U.S. Application Data (60) Provisional application No. 60/077,605, filed on Mar. 10, 1998.

(51) Int. Cl.[7] .................................................. H01L 27/00
(52) U.S. Cl. .......................................................... 250/208.1
(58) Field of Search ........................ 250/208.1; 348/300, 348/301, 302, 308, 241, 250, 294, 303, 304, 307, 309, 310, 315

(56) References Cited

U.S. PATENT DOCUMENTS

| | | | |
|---|---|---|---|
| 4,425,550 | 1/1984 | Smith et al. | 330/107 |
| 5,097,305 | 3/1992 | Mead et al. | 357/30 |
| 5,324,958 | 6/1994 | Mead et al. | 257/291 |
| 5,410,348 | 4/1995 | Hamaski | 348/297 |
| 5,436,442 | 7/1995 | Michon et al. | 250/208.1 |
| 5,512,750 | 4/1996 | Yanka et al. | 250/338.4 |
| 5,793,322 | 8/1998 | Fossum et al. | 341/161 |
| 5,841,126 | 11/1998 | Fossum et al. | 250/208.1 |

OTHER PUBLICATIONS

Mendis et al., "CMOS Active Pixel Image Sensors for Highly Integrated Imaging Systems", IEEE Journal of Solid-State Circuits, vol. 32, No. 2, Feb. 1997, pp. 187-197.

Nixon et al., "256×256 CMOS Active Pixel Sensor Camera-on-a-Chip", IEEE Journal of Solid-State Circuits, vol. 31, No. 12, Dec. 1996, pp. 2046-2050.

Mendis et al., "A 128×128 CMOS Active Pixel Image Sensor for Highly Integrated Imaging Systems", IEEE 1993, pp. 22.6.1-22.6.4.

Mendis et al., "Progress in CMOS Active Pixel Image Sensors", Proceedings of the SPIE-The International Society for Optical Engineering, vol. 2172, pp. 19-29 (1994).

Campana, S.B., "Techniques for Evaluating Charge Coupled Imagers", Optical Engineering, vol. 16, No. 3, May-Jun. 1977, pp. 267-274.

Nomura et al., A 256×256 BCAST Motion Detector with Simultaneous Video Output, Conference, IEEE International Solid-State Circuits, Digest of Technical Papers (1998).

Primary Examiner—Ricky Mack
(74) Attorney, Agent, or Firm—Fish & Richardson P.C.

(57) ABSTRACT

A CMOS imager includes an array of CMOS active pixel sensors and multiple column readout circuits each of which is associated with a respective column of sensors in the array and can perform correlated double sampling of values from a sensor in the respective column. Each column readout circuit also includes a crowbar switch which selectively can be enabled to force the stored values to an operational amplifier-based charge sensing circuit via a pair of buses. The operational amplifier-based charge sensing circuit, which includes a pair of switched integrators each of which is coupled to one of the buses, provides a differential output based on the values stored by a selected one of the column readout circuits.

23 Claims, 6 Drawing Sheets

CHARGE-DOMAIN ANALOG READOUT FOR AN IMAGE SENSOR

This Appln claims the benefit of Provisional No. 60/077,605 filed Mar. 10, 1998.

BACKGROUND

The present disclosure relates, in general, to image sensors and, in particular, to charge-domain analog readout circuits for such sensors.

Image sensors find applications in a wide variety of fields, including machine vision, robotics, guidance and navigation, automotive applications, and consumer products. In many smart image sensors, it is desirable to integrate on-chip circuitry to control the image sensor and to perform signal and image processing on the output image. Unfortunately, charge-coupled device (CCD), which have been one of the dominant technologies used for image sensors, do not easily lend themselves to large scale signal processing and are not easily integrated with CMOS circuits. Moreover, a CCD is read out by sequentially transferring the signal charge through the semiconductor, and the readout rate is limited by the need for nearly perfect charge transfer.

Active pixel sensors (APS), which have one or more active transistors within the pixel unit cell, can be made compatible with CMOS technologies and promise higher readout rates compared to passive pixel sensors. Active pixel sensors are often arranged as arrays of elements, which can be read out, for example, a column at a time. Each column can be read out at one time, driven and buffered for sensing by a readout circuit.

Figure 1:
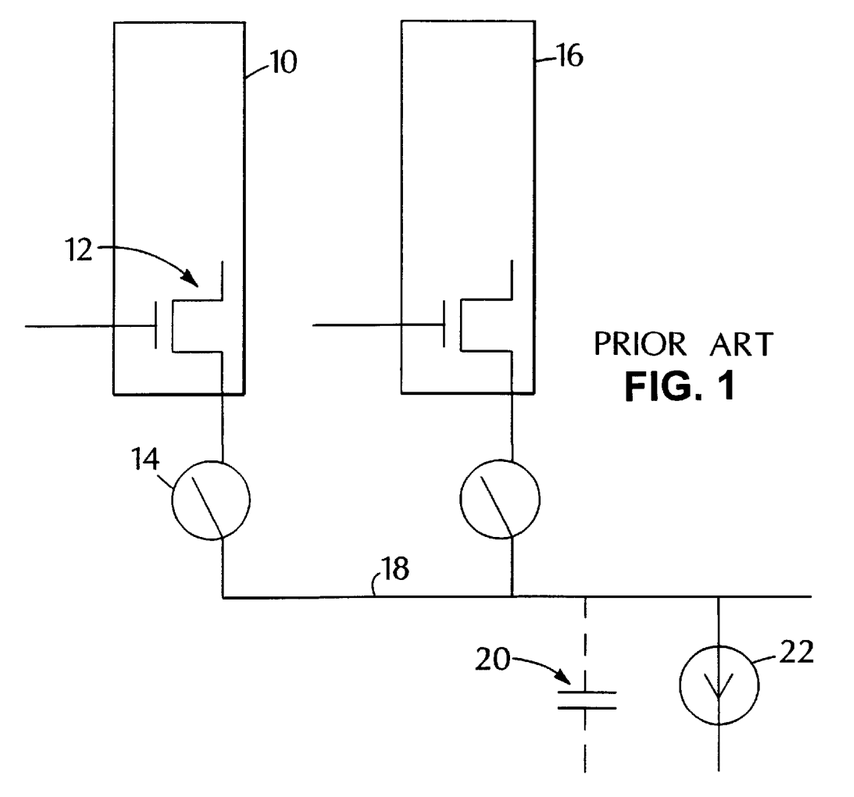
FIG. 1 illustrates a active pixel sensor array with a conventional common readout bus line.

An exemplary voltage mode circuit is shown in FIG. 1. Each column, such as the column 10, includes a source-follower 12. The column 10 is enabled by a switch 14 to drive its output onto a common bus line 18. Other columns such as 16 can alternately be driven onto the bus line 18. The bus line includes an inherent stray capacitance shown as 20. Typically, a single constant current 22 is used in common for all the source-followers.

The source-follower 12 is formed with a drain, source, and gate. The speed of such a source-follower can be increased by increasing the channel length which also requires increasing the current on the source 22. However, increasing the channel length has the undesirable effect of increasing the stray capacitance 20, thereby decreasing the speed. Such a trade-off results in a little improvement in speed because the increase in capacitance tends to offset the increase in power.

Accordingly, it is desirable to provide a circuit which has improved capacity for reading out signals from an array of active pixel sensors.

SUMMARY

In general, according to one aspect, a charge-domain readout circuit includes multiple column readout circuits each of which can sample and store signal and reset values of an active pixel sensor. Each of the column readout circuits is associated with a respective column of sensors in an active pixel sensor array. The charge-domain readout circuit includes a first bus for receiving the signal value stored by a selected one of the column readout circuits and a second bus for receiving a reset value stored by the selected one of the column readout circuits. An operational amplifier-based charge sensing circuit maintains a substantially constant voltage on the first and second buses and provides a differential output based on the values stored by the selected one of the column readout circuits.

According to another aspect, a CMOS imager includes an array of active pixel sensors and a charge-domain readout circuit similar to that just described.

Various implementations include one or more of the following features. Each column readout circuit can include multiple sample and hold circuits. Each of the sample-and-hold circuits can include a charge storage element and a first switch which selectively can be enabled to sample a value from a sensor in the array to be stored by the charge storage element. For example, each column readout circuit can include multiple capacitive elements for storing correlated double sampled signal and reset values from a sensor in the array. Each column readout circuit can include second switches which selectively can be enabled to hold one side of the charge storage elements at a reference voltage when a corresponding one of the first switches is enabled to sample a value from a sensor. In some implementations, each column readout circuit includes a switch, such as a crow-bar switch, which selectively can be enabled to short together one side of each charge storing element.

The charge sensing circuit can includes, for example, a first switched integrator coupled to the first bus and a second switched integrator coupled to the second bus. Each of the switched integrators can include an operational amplifier, a feedback capacitive element coupled between an output and a first input of the operational amplifier, and a switch coupled between the output and the first input of the operational amplifier to selectively reset the switched integrator.

Each operational amplifier can have a reference voltage coupled to its second input. The switches in the switched integrators selectively can be enabled to hold one side of a corresponding one of the charge storage elements in a sample-and-hold circuit at the reference voltage when a corresponding one of the first switches in the sample-and-hold circuit is enabled to sample a value from the sensor.

According to another aspect, a method of reading out values from active pixel sensors in an array of sensors includes selecting a row of sensors whose values are to be read out and storing correlated double sampled values for multiple sensors in the selected row. The values for each sensor are stored by a respective readout circuit associated with a column in the array in which the sensor is located. The method also includes sensing the stored values associated with the sensors in the selected row using an operational amplifier-based charge sensing circuit that is common to the readout circuits. A differential output is sequentially provided from the sensing circuit for each of the sensors in the selected row.

In various implementations, the act of storing correlated double sampled values can include sampling and storing a signal value of a sensor and sampling and storing a reset value of the sensor. The method can further include setting a reference voltage on first sides of respective capacitive elements and subsequently coupling the signal and reset values to second sides of the respective capacitive elements. The reference voltage can be provided from the common operational amplifier-based charge sensing circuit. Furthermore, sensing the stored values can include using a crowbar switch to force charge stored in each respective readout circuit onto feedback capacitive elements in the operational amplifier-based charge sensing circuit.

In the present description, the functions performed with respect to columns and rows of pixels in an array can be reversed. Accordingly, a reference to a column in a twodimensional pixel sensor array should be understood as referring to one or more pixel sensors along one axis of the array, and a reference to a row in the array should be understood as referring to one or more pixel sensors along a second axis of the array, where the second axis is orthogonal to the first axis.

Various implementations include one or more of the following advantages. Sensing charge injected onto a bus line using a charge-sensitive operational amplifier-based circuit allows the voltage on the bus to remain substantially constant. That, in turn, permits the stored pixel values to be read out at a high rate. In addition, the column readout circuits can be simplified by coupling the sampling capacitors directly to the bus. The column drivers and the column readout circuits can, therefore, be relatively small. In addition, the ability of the charge-domain readout circuit to operate in a double sampling differential mode with a crowbar circuit can provide very sensitive performance. For example, sampling both the reset and signal levels allows correlated double sampling (CDS) to be performed which can reduce various types of noise. Use of the crowbar switch can help reduce fixed pattern noise (FPN) which is dominated by column-to-column variations due to the column parallel readout structure.

Other features and advantages will be readily apparent from the following description, accompanying drawings and the claims.

DETAILED DESCRIPTION

Figure 2:
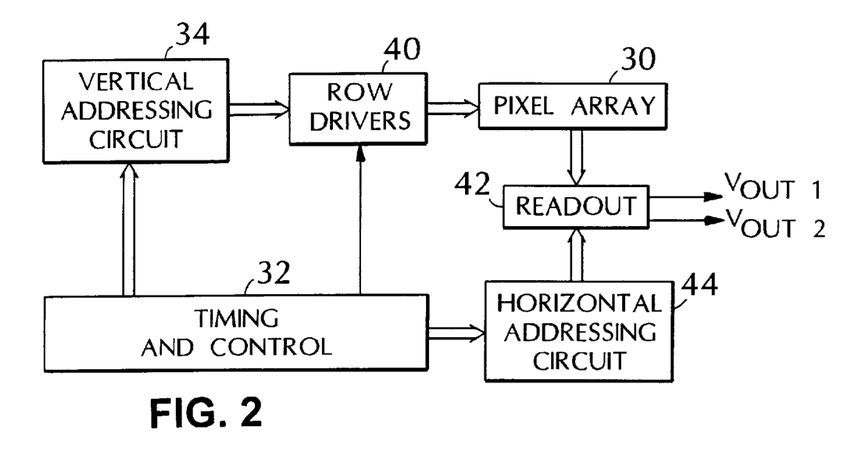
FIG. 2 is a block diagram of an exemplary CMOS active pixel sensor chip.

FIG. 2 shows an exemplary CMOS active pixel sensor integrated circuit chip that includes an array of active pixel sensors 30 and a controller 32 which provides timing and control signals to enable reading out of signals stored in the pixels. Exemplary arrays have dimensions of 128 by 128 pixels or 256 by 256 pixels, although, in general, the size of the array 30 will depend on the particular implementation. The imager is read out a row at a time using a column parallel readout architecture. The controller 32 selects a particular row of pixels in the array 30 by controlling the operation of vertical addressing circuit 34 and row drivers 40. Charge signals stored in the selected row of pixels are provided to a readout circuit 42. The pixels read from each of the columns then can be read out sequentially using a horizontal addressing circuit 44. Differential pixel signals (VOUT1, VOUT2) are provided at the output of the readout circuit 42.

Figure 3:
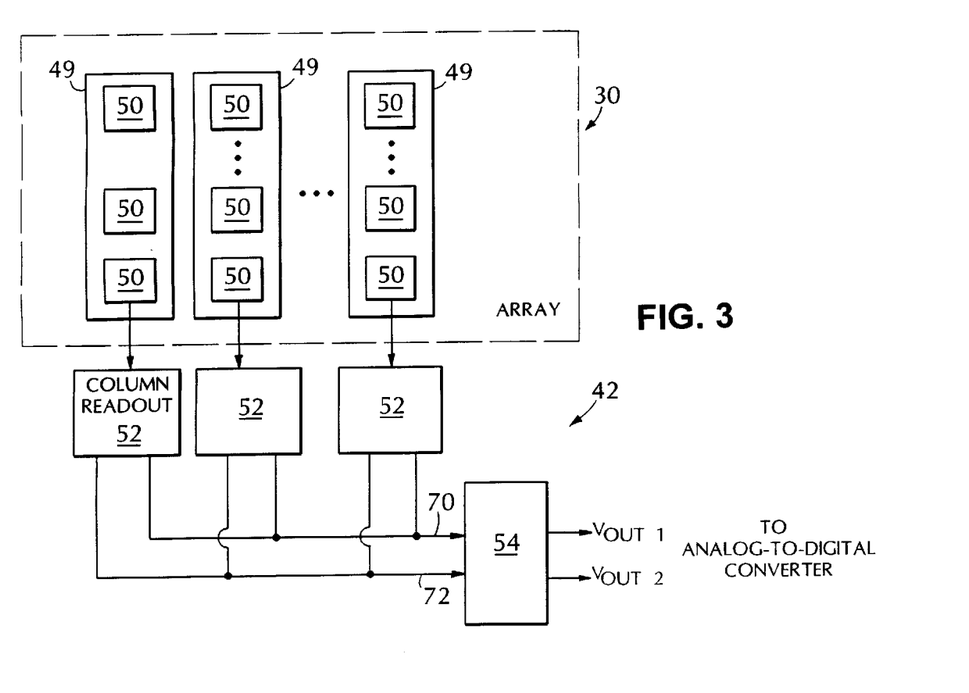
FIG. 3 is a block diagram of an array of active pixel sensors and a readout circuit.

As shown in FIG. 3, the array 30 includes multiple columns 49 of CMOS active pixel sensors 50. Each column includes multiple rows of sensors 50. Signals from the active pixel sensors 50 in a particular column can be read out to a readout circuit 52 associated with that column. Signals stored in the readout circuits 52 then can be read to an output stage 54 which is common to the entire array of pixels 30. The analog output signals can then be sent, for example, to a differential analog-to-digital converter (ADC).

Figures 4, 5:
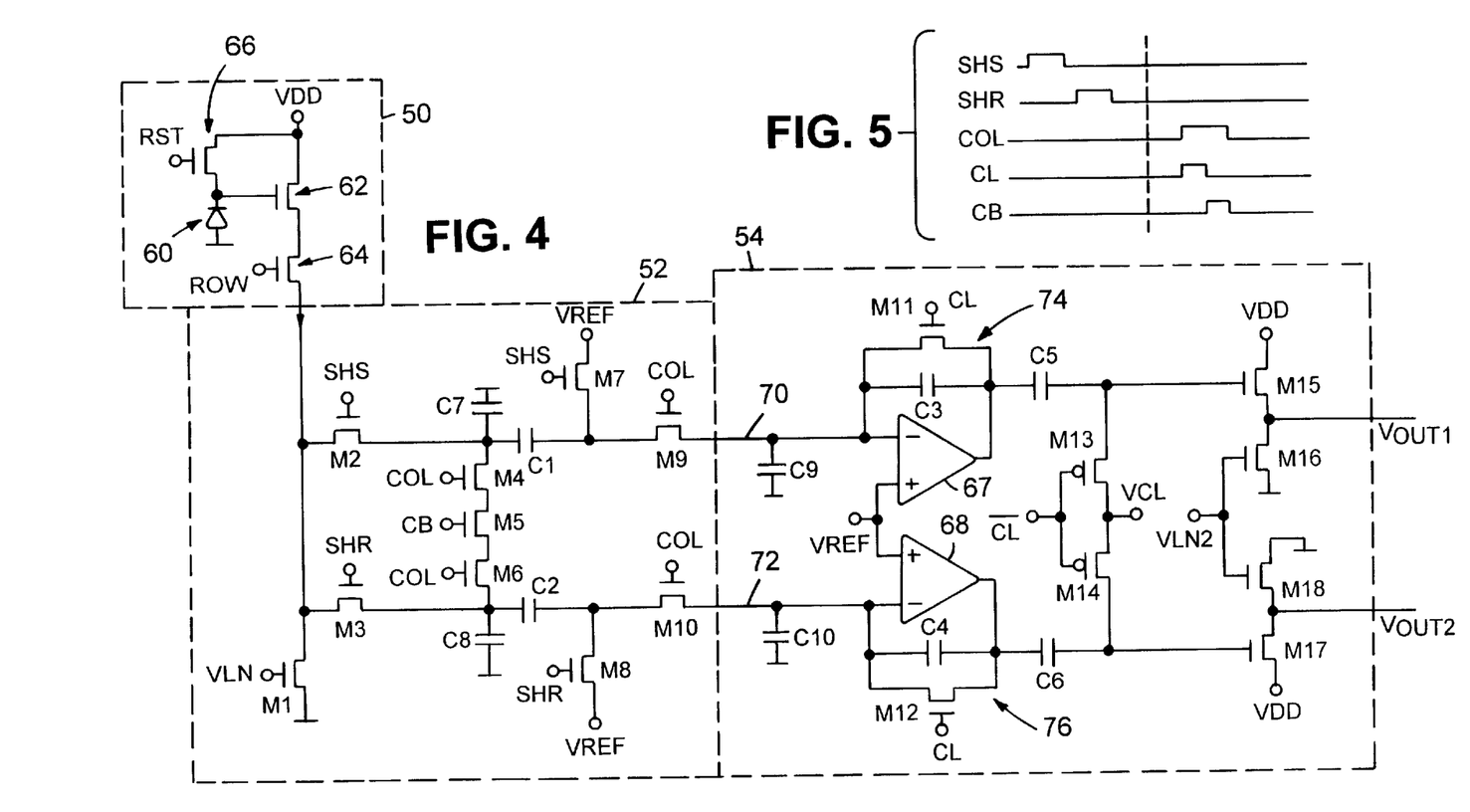
FIG. 4 illustrates one embodiment of an active pixel sensor with a readout circuit.
FIG. 5 is a timing diagram associated with FIG. 4.

FIG. 4 illustrates a single CMOS active pixel sensor 50 with an exemplary column readout circuit 52, which is common to an entire column 49 of pixels, and an exemplary output stage 54, which is common to the entire array of pixels 30.

The pixel 50 has a photo-sensitive element 60 buffered by a source-follower transistor 62 and a row selection switch which can be implemented by a transistor 64. A signal (ROW) is applied to the gate of the row selection transistor 64 to enable a particular row of pixels. In one implementation, the element 60 includes a photogate with a floating diffusion output separated by a transfer gate. The pixel 50 also includes a reset switch which can be implemented as a reset transistor 66 controlled by a signal (RST) applied to its gate.

The column readout circuit 52 includes a load transistor M1 of the source-follower 62 with a signal (VLN) applied to the gate of transistor M1, and two sample-and-hold circuits for storing the signal level and reset level of a selected pixel. Sampling both the reset and signal levels allows correlated double sampling (CDS) to be performed which can reduce reset noise associated with the pixel as well as noise associated with the source-follower transistor 62. One sample-and-hold circuit includes a switch, implemented as transistor M2 in FIG. 4, and a capacitor C1. A signal (SHS) is applied to the gate of the transistor M2 to control whether the transistor is in a conductive or non-conductive state. The second sample-and-hold circuit also includes a switch, implemented in FIG. 4 as transistor M3, and a capacitor C2. A signal (SHR) is applied to the gate of the transistor M3 to control the state of the transistor. The right-hand plate of the capacitors C1, C2 can be held at a reference voltage (VREF) by closing an associated switch, implemented in FIG. 4 as transistors M7 and M8, respectively. The signal SHS also controls the state of the transistor M7, and the signal SHR controls the state of the transistor M8.

In addition to the sample-and-hold circuits, the column readout circuit 52 includes a crowbar switch, implemented in FIG. 4 as transistor M5, and two column selection switches on either side. The column selection switches are shown as transistors M4 and M6. The state of the crowbar transistor M5 is controlled by a signal CB applied to its gate. Similarly, the states of the column selection switches M4, M6 are controlled by a signal (COL) applied to their respective gates. Use of the crowbar switch M5 can help reduce fixed pattern noise (FPN) which is dominated by column-to-column variations due to the column parallel readout structure. In addition to the foregoing elements, the column readout circuit 52 also has parasitic capacitances C7, C8 associated with it. Those capacitances can help stabilize various voltages in the circuit and, therefore, can be intentionally included.

Signals stored by the capacitors C1, C2 can be provided to the output stage 54 through respective switches implemented as transistors M9, M10. The column selection signal COL applied to the respective gates of the transistors M9, M10 controls whether those transistors M9, M10 are conductive or non-conductive. When the column selection transistor M9 (or M10) are turned on, the sampling capacitor C1 (or C2) is coupled directly to a bus 70 (or 72).

As previously mentioned, the output stage 54 of the charge-domain readout circuit is common to the entire array 30 of pixels. Thus, although only a single column readout circuit 52 is illustrated in FIG. 4, multiple column readout circuits are coupled to the output stage 54 which includes a pair of switched integrators 74, 76. Each switched integrator 74 (or 76) includes an operational amplifier 67 (or 68), a feedback capacitor C3 (or C4) coupled between the output and the negative terminal of the operational amplifier, and a reset switch M11 (or M12) coupled between the output and the negative terminal of the operational amplifier. Each integrator 74 (or 76) selectively can be reset by turning on the associated reset switch M11 (or M12) using a signal (CL) applied to the gate of the reset switch. A reference voltage (VREF) is provided to the positive terminals of the operational amplifiers 67, 68. The output stage 54 also has parasitic capacitances C9, C10 associated with common bus lines 70, 72.

The output signals (VOUT1, VOUT2) can be taken, respectively, from output source-follower transistors M15, M17, each of which has a load transistor M16, M18 associated with it. In the particular embodiment shown in FIG. 4, the transistors M1, M2, M3, M4, M5, M6, M7, M8, M9, M10, M11, M12, M15, M16, M17 and M18 are n-channel MOS (NMOS) transistors.

In the implementation of FIG. 4, the output stage 54 also includes coupling capacitors C5, C6 and a clamp circuit with p-channel MOS (PMOS) switches M13, M14. The respective drains of the clamp switches M13, M14 are held at a clamp potential (VCL). The states of the clamp switches M13, M14 are controlled by the inverse of the signal (CL) applied to the gates of the reset switches M11, M12. In some embodiments, the outputs of the operational amplifiers 67, 68 are coupled directly to the source-follower transistors M15, M17. In such embodiments, the coupling capacitors C5, C6 and the clamp switches M13, M14 can be left out of the circuit. Similarly, in some embodiments, the outputs of the operational amplifiers 67, 68 can be coupled directly to a differential analog-to-digital converter.

Figure 6:
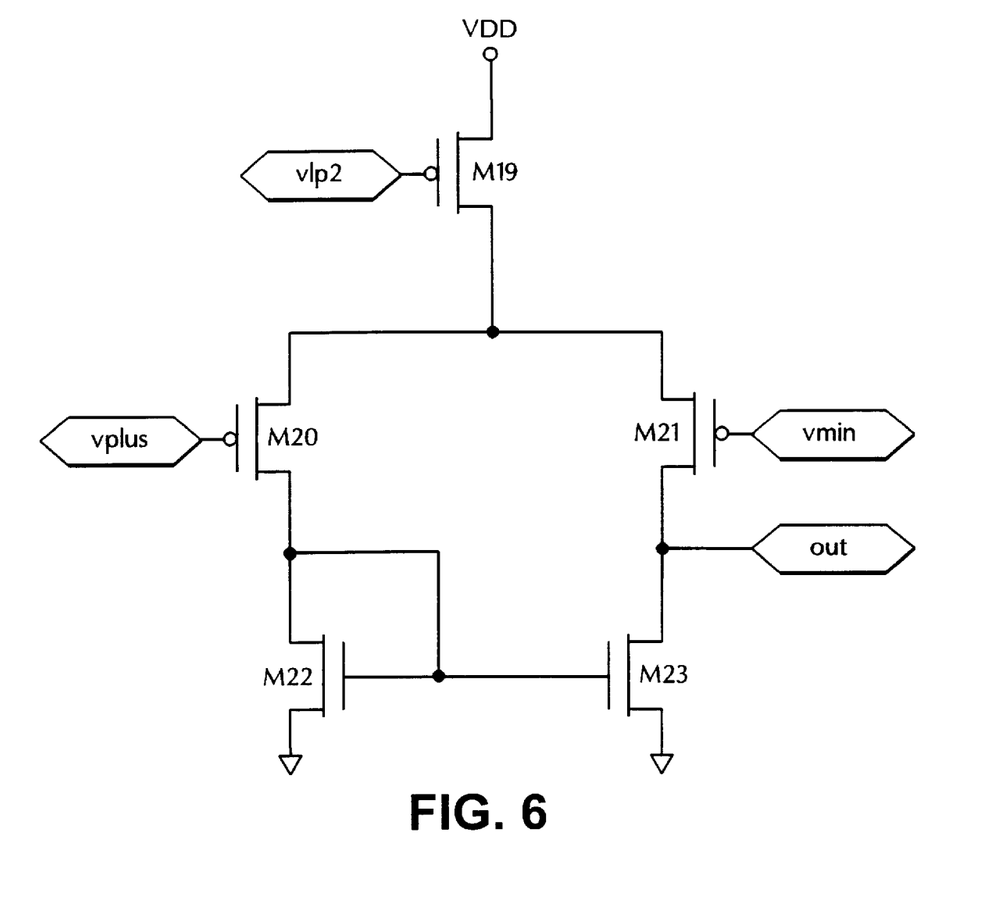
FIG. 6 is an exemplary circuit for operational amplifiers used in the circuit of FIG. 4.

Exemplary values of the voltages VDD, VREF, VCL, VLN and VLN2 are 3.3 V, 1.65 V, 2 V, 1 V and 1 V, respectively. Other values may be used in different implementations. FIG. 6 illustrates an exemplary implementation of the operational amplifier 67 (or 68) in which transistors M19, M20 and M21 are PMOS transistors, and transistors M22 and M23 are NMOS transistors. Other operational amplifiers can be used in different implementations. Exemplary sizes for the various transistors and capacitors are listed in TABLE 1.

TABLE 1

| Element | Size (W/L) | Size (pF) |
| --- | --- | --- |
| M1 | 3/1.2 | |
| M2, M3 | 0.9/0.6 | |
| M4, M5, M6 | 2.8/0.6 | |
| M7, M8, M9, M10, M11, M12 | 2.4/0.6 | |
| M13, M14 | 3.6/0.6 | |
| M15, M17 | 72/0.6 | |
| M16, M18 | 36/0.6 | |
| M19 | 48/0.9 | |
| M20, M21 | 50/0.9 | |
| M22, M23 | 24/1.2 | |

TABLE 1-continued

| Element | Size (W/L) | Size (pF) |
| --- | --- | --- |
| C1, C2 | | 1 |
| C3, C4 | | 0.5 |
| C5, C6 | | 1 |
| C7, C8, C9, C10 | | 0.4 |

The operation of the readout circuit of FIG. 4 is explained with reference to the timing diagram of FIG. 5. During signal integration in the pixel array 30, the row selection transistors, such as the transistor 64, are turned off by setting the row selection signal (ROW) to a low signal such as 0 volts (V). Following signal integration, an entire row of pixels are read out substantially simultaneously.

In general, the readout circuit of FIG. 4 operates in a double sampling differential mode. First, the pixels in the row to be read are addressed by enabling the corresponding row selection transistors, for example, row selection transistor 64. Thus, the signal value on photosensitive element 60 is switched through the source-follower transistor 62 and the row selection transistor 64. The sampled pixel value is switched through the transistor M2 to one side of the capacitor C1 by turning on the sampling transistor M2. The other side of capacitor C1 is set and held at the reference voltage (VREF) through the transistor M7.

After the capacitor C1 is charged to the proper voltage, the transistor M7 is turned off, and the photosensitive element 60 is reset using the reset transistor 66. The reset level of the pixel 50 is sampled by the transistor M3 and stored on the capacitor C2, the other end of which is held at the reference voltage (VREF) through the transistor M8. Once the capacitor C2 is charged to the pixel reset value, the transistor M8 is turned off.

After the initial sampling steps, the capacitors C1 and C2, respectively, hold sample and reset levels. Each of the transistors M2, M3, M7, and M8 is off. Next, the signal and reset values corresponding to the selected row of pixels are sent from the respective column readout circuits 52 to the output stage 54. The column readout circuits 52 are read sequentially, one at a time.

To read out the signal and reset values stored by the capacitors C1 and C2 of a particular column readout circuit 52, the column select transistors M9 and M10 are turned on to connect the outputs of capacitors C1 and C2 to the input of the respective operational amplifiers 67, 68. The transistors M4, M5 are turned on at about the same time as the transistors M9, M10. When the transistors M9, M10 are first turned on, the integrators 74, 76 are held in reset by the transistors M11, M12. Resetting the switched integrators 74, 76 erases any previously-stored signals and restores the reference voltage (VREF) on the readout buses 70, 72. After the integrators 74, 76 have been reset, the transistors M11, M12 are turned off. Substantially simultaneously, the crowbar transistor M5 is turned on which has the effect of shorting together the common sides of capacitors C1, C2, thereby pumping charge from capacitors C1, C2 through the respective transistors M9, M10 and to the integrators 74, 76. This forces the charge from the capacitors C1, C2 onto the integrators' capacitors C3, C4. The outputs of the integrators 74, 76 also charge the respective coupling capacitors C5, C6. The effect is that the charge is driven through the circuit of the system and offsets are reduced or eliminated. The differential outputs (VOUT1, VOUT2) depend on the difference between the reset and signal voltages that were stored on the capacitors C2 and C3.

Once the signal and reset values stored in the particular one of the column readout circuits 52 has been read by the output stage 54, the signal and reset values stored in other column readout circuits can be read sequentially by the output stage. When all the pixels from the selected row have been read by the output stage 54, the process can be repeated for a new row of pixels in the array 30.

Figure 7:
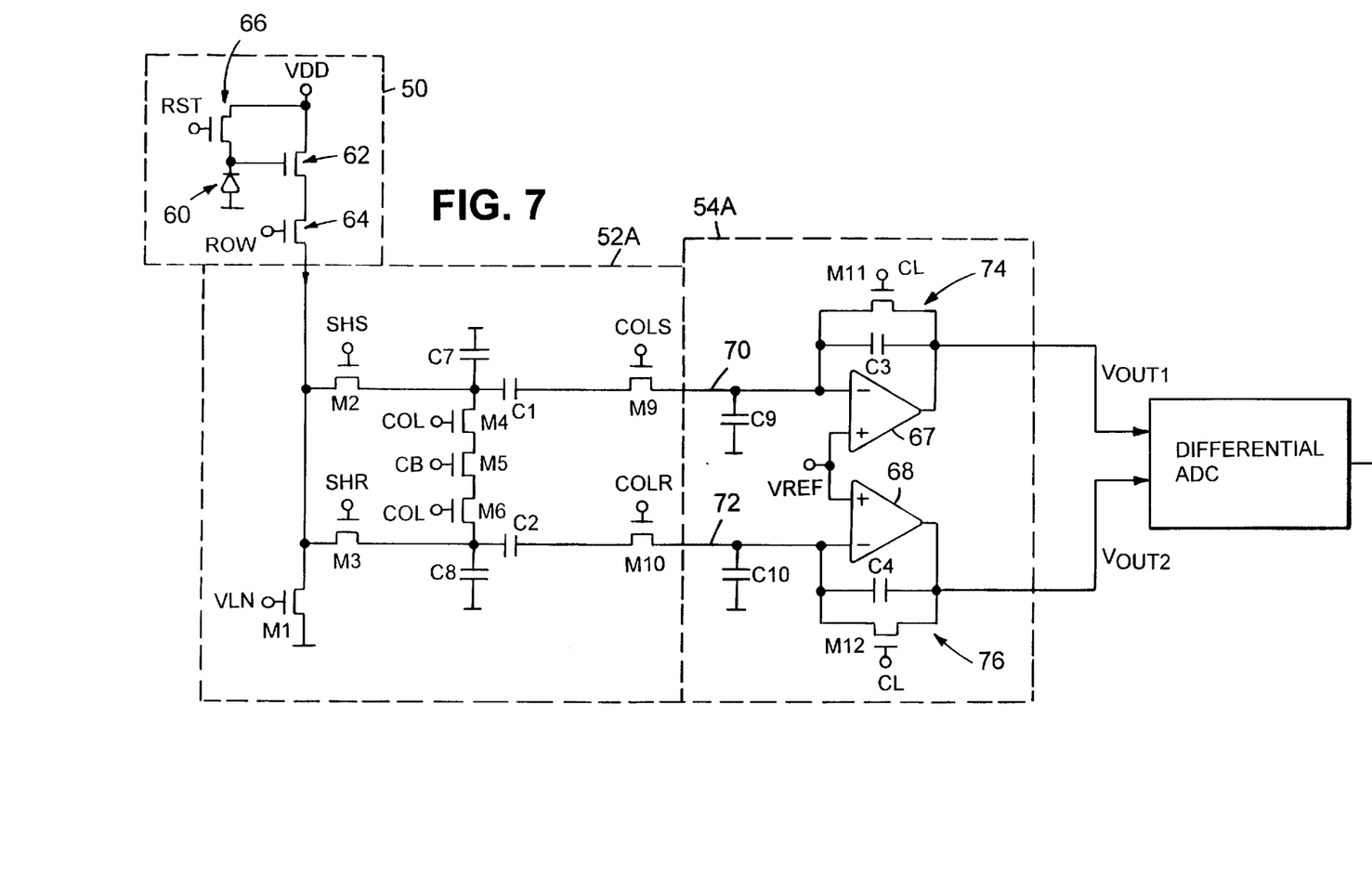
FIG. 7 illustrates another embodiment of an active pixel sensor with a readout circuit.

FIG. 7 shows an alternative column readout circuit 52A and output stage circuit 54A. The primary differences between the column readout circuit 52 and the circuit 52A are the elimination of the transistors M7 and M8. Also, as shown in FIG. 7, the outputs of the switched integrators 74, 76 in the output stage circuit 54A are coupled directly to a differential analog-to-digital converter 78. In other implementations, the circuit 54A can include coupling capacitors, a clamp circuit and/or output source-followers as discussed above with respect to FIG. 4.

Figure 8:
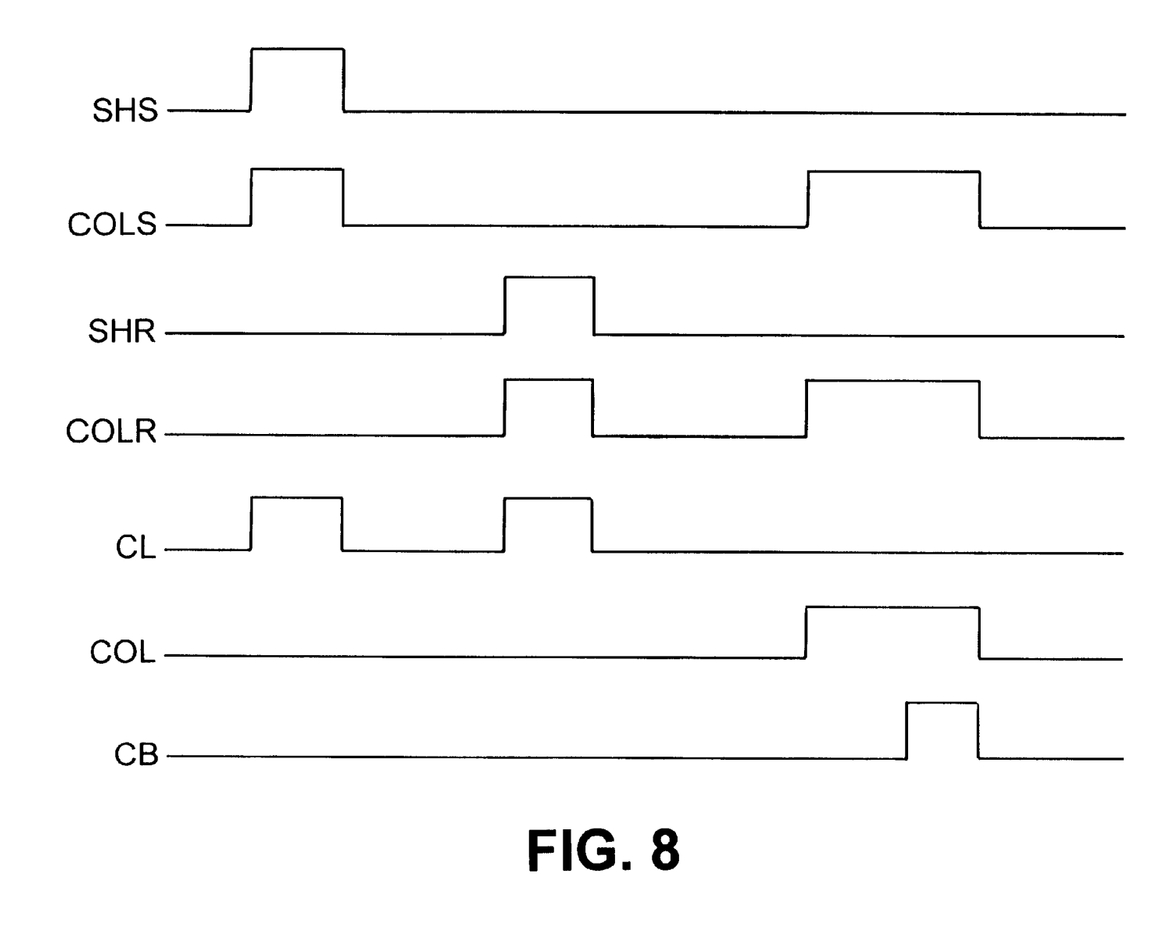
FIG. 8 is a timing diagram associated with FIG. 7.

The operation of the circuit of FIG. 7 is now described with reference to the timing diagram of FIG. 8. Following signal integration, an entire row of pixels are read out substantially simultaneously. The pixels in the row to be read are addressed by enabling the corresponding row selection transistors, for example, row selection transistor 64. The sampled pixel value is switched through the transistor M2 to one side of the capacitor C1 by turning on the sampling transistor M2. The other side of the capacitor C1 is held at the reference voltage (VREF) by substantially simultaneously turning on the column selection transistor M9 and resetting the integrator 74, in other words, by turning on the reset transistor M11.

After the capacitor C1 is charged to the proper voltage, the transistors M2, M9 and M11 are turned off, and the photosensitive element 60 is reset using the reset transistor 66. The reset level of the pixel 50 is sampled by the transistor M3 and stored on the capacitor C2. The other end of the capacitor C3 is held at the reference voltage (VREF) by substantially simultaneously turning on the column selection transistor M10 and resetting the integrator 76, in other words, by turning on the reset transistor M12. Once the capacitor C2 is charged to the pixel reset value, the transistors M3, M10 and M12 are turned off.

After these initial sampling steps, the capacitors C1 and C2, respectively, hold sample and reset levels. Each of the transistors M2, M3, M7, and M8 is off. Next, the signal and reset values corresponding to the selected row of pixels are sent from the respective column readout circuits 52A to the output stage 54A. The column readout circuits 52A are read out sequentially, one at a time, in the same manner as described above with respect to FIG. 4. The column selection switches M9 and M10 are enabled, and at about the same time, the switches M4, M6 on either side of the crowbar switch M5 also are turned on. Then, the crowbar switch M5 is enabled to short together the common sides of capacitors C1, C2, thereby pumping charge from the capacitors C1, C2 through the respective transistors M9, M10 and to the integrators 74, 76 in the output stage 54A.

One advantage of the readout circuit shown in FIG. 7 is that the reference voltage (VREF) used to set the voltage on the right-hand side of the capacitors C1, C2 during the initial sampling steps has the same value as the voltage at the negative input of the operational amplifiers 67, 68. In general, the voltage on the negative terminal can vary slightly from the voltage on the positive terminal due to an input offset. In the present circuit, the same voltage is used during the initial sampling steps and the subsequent readout stage. The resulting differential outputs (VOUT1, VOUT2) can, therefore, be more precise.

During the initial sampling steps, the operational amplifiers 67, 68 must charge one plate of the respective capacitors C1, C2 in each of the column readout circuits 52A at the same time, thereby introducing a slight delay. In contrast, according to the configuration of FIG. 4, the right-hand plates of the capacitors C1, C2 are charged to the reference voltage (VREF) through separate switches M7, M8 which are part of the column readout circuit 52. The implementation of FIG. 4, therefore, can operate somewhat more quickly.

The foregoing implementations have been explained assuming that the pixels operate in a photodiode mode in which the pixel signal value is sampled prior to the pixel reset value. However, in other implementations, the pixels can operate in a photogate mode in which the reset value is sampled prior to the signal value.

Several implementations of a charge-domain readout circuit have been described. Charge injected onto the bus line 70 (or 72) can be sensed using a switched integrator 74 (or 76) which allows the column drivers and the column readout circuits to be relatively small. In addition, the charge-domain readout circuit can operate in a double sampling differential mode with a crowbar circuit to provide very sensitive performance.

Other implementations are within the scope of the following claims.

What is claimed is:

1. A charge-domain readout circuit comprising:
   a plurality of column readout circuits each of which can sample and store signal and reset values of an active pixel sensor, wherein each of the column readout circuits is associated with a respective column of sensors in an active pixel sensor array;
   a first bus for receiving the signal value stored by a selected one of the column readout circuits;
   a second bus for receiving a reset value stored by the selected one of the column readout circuits; and
   an operational amplifier-based charge sensing circuit, wherein the charge sensing circuit maintains a substantially constant voltage on the first and second buses and wherein the charge sensing circuit provides a differential output based on the values stored by the selected one of the column readout circuits.

2. The circuit of claim 1 wherein each column readout circuit includes a plurality of sample and hold circuits.

3. The circuit of claim 2 wherein each sample and hold circuit includes:
   a charge storage element; and
   a first switch which selectively can be enabled to sample a value from a sensor in the array to be stored by the charge storage element.

4. The circuit of claim 3 wherein each column readout circuit includes a plurality of second switches which selectively can be enabled to hold one side of the charge storage elements at a reference voltage when a corresponding one of the first switches is enabled to sample a value from a sensor.

5. The circuit of claim 3 wherein each column readout circuit includes a switch which selectively can be enabled to short together one side of each charge storing element.

6. The circuit of claim 1 wherein the charge sensing circuit includes:
   a first switched integrator coupled to the first bus; and
   a second switched integrator coupled to the second bus.

7. The circuit of claim 1 wherein each column readout circuit includes a plurality of capacitive elements for storing correlated double sampled signal and reset values from a sensor in the array.

8. The circuit of claim 7 wherein each column readout circuit includes a crowbar switch which selectively can be enabled to short together respective first sides of the capacitive elements.

9. The circuit of claim 6 wherein each of the first and second switched integrators includes:
an operational amplifier;
a feedback capacitive element coupled between an output and a first input of the operational amplifier; and
a switch coupled between the output and the first input of the operational amplifier to selectively reset the switched integrator.

10. The circuit of claim 9 wherein each operational amplifier includes a reference voltage coupled to a second input of the operational amplifier.

11. The circuit of claim 10 wherein each column readout circuit includes:
a pair of sample and hold circuits, each of which includes a charge storage element and a first switch which selectively can be enabled to sample a value from a sensor in the array to be stored by the charge storage element;
wherein each switch in the switched integrators selectively can be enabled to hold one side of a corresponding one of the charge storage elements at the reference voltage when a corresponding one of the first switches is enabled to sample a value from the sensor.

12. The circuit of claim 6 wherein each column readout circuit includes:
a pair of sample and hold circuits, each of which includes a charge storage element, a first switch which selectively can be enabled to sample a value from a sensor in the array to be stored by the charge storage element, and a second switch which selectively can be enabled to couple the charge storage element directly to one of the buses.

13. A CMOS imager comprising:
an array of CMOS active pixel sensors;
a plurality of column readout circuits each of which can sample and store signal and reset values of an active pixel sensor, wherein each of the column readout circuits is associated with a respective column of sensors in the array;
a first bus for receiving the signal value stored by a selected one of the column readout circuits;
a second bus for receiving a reset value stored by the selected one of the column readout circuits; and
an operational amplifier-based charge sensing circuit, wherein the charge sensing circuit maintains a substantially constant voltage on the first and second buses and wherein the charge sensing circuit provides a differential output based on the values stored by the selected one of the column readout circuits.

14. The circuit of claim 13 wherein each column readout circuit includes a plurality of capacitive elements for storing correlated double sampled signal and reset values from a sensor in the array.

15. The circuit of claim 14 wherein each column readout circuit includes a crowbar switch which selectively can be enabled to short together respective first sides of the capacitive elements.

16. The circuit of claim 13 wherein the operational amplifier-based charge sensing circuit includes a pair of switched integrators.

17. The circuit of claim 16 wherein each of the switched integrators includes:
an operational amplifier;
a feedback capacitive element coupled between an output and a first input of the operational amplifier; and
a switch coupled between the output and the first input of the operational amplifier to selectively reset the switched integrator.

18. A CMOS imager comprising:
an array of CMOS active pixel sensors;
a plurality of column readout circuits each of which is associated with a respective column of sensors in the array and which can perform correlated double sampling of values from a sensor in the respective column;
an operational amplifier-based charge sensing circuit including a pair of switched integrators for providing a differential output based on values stored by a selected one of the column readout circuits;
a pair of buses each of which is coupled to a respective one of the switched integrators and each of which selectively can be coupled to an output of any one of the column readout circuits;
wherein each column readout circuit further includes a crowbar switch which selectively can be enabled to force the values stored by the column readout circuit to one of the switched integrators via a corresponding one of the buses.

19. A method of reading out values from active pixel sensors in an array of sensors, the method comprising:
selecting a row of sensors whose values are to be read out;
storing correlated double sampled values for a plurality of sensors in the selected row, wherein the values for each sensor are stored by a respective readout circuit associated with a column in the array in which the sensor is located;
sensing the stored values associated with the plurality of sensors in the selected row using an operational amplifier-based charge sensing circuit that is common to the readout circuits; and
sequentially providing a differential output from the sensing circuit for each of the plurality of sensors in the selected row.

20. The method of claim 19 wherein the act of storing correlated double sampled values includes sampling and storing a signal value of a sensor and sampling and storing a reset value of the sensor.

21. The method of claim 20 including setting a reference voltage on first sides of respective capacitive elements and subsequently coupling the signal and reset values to second sides of the respective capacitive elements.

22. The method of claim 21 wherein setting a reference voltage includes providing the reference voltage from the common operational amplifier-based charge sensing circuit.

23. The method of claim 19 wherein sensing the stored values includes using a crowbar switch to force charge stored in each respective readout circuit onto feedback capacitive elements in the operational amplifier-based charge sensing circuit.

* * * * *